Oct. 3, 1961
S. E. ARNETT ET AL
3,002,349
FUEL CONTROL APPARATUS FOR AN INTERNAL COMBUSTION ENGINE
Filed July 26, 1956
3 Sheets-Sheet 1
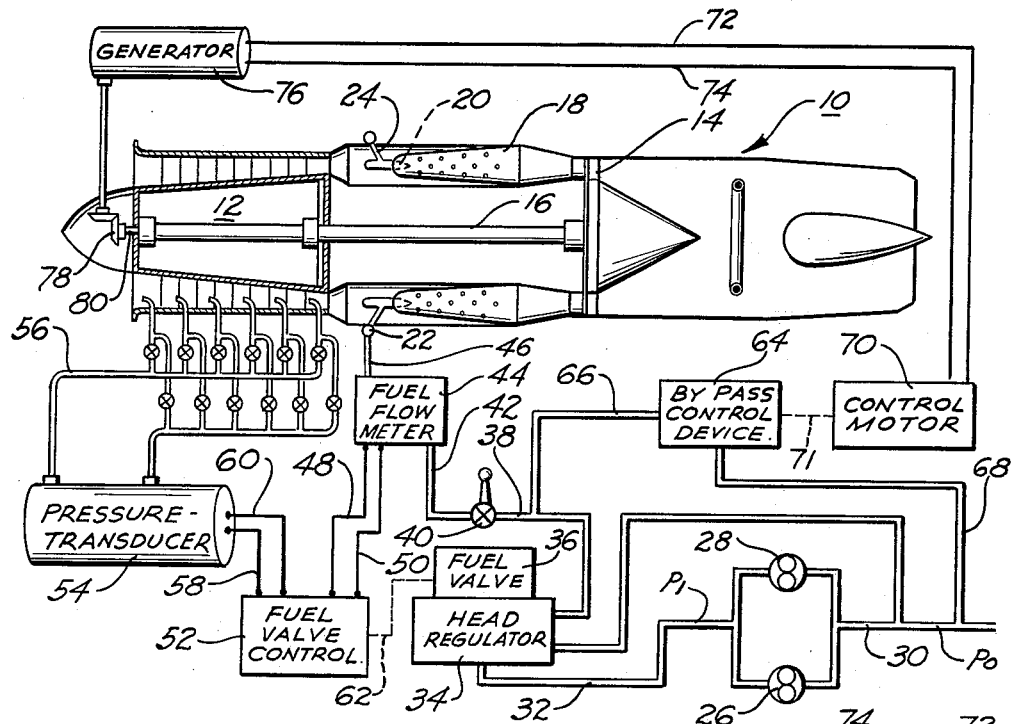
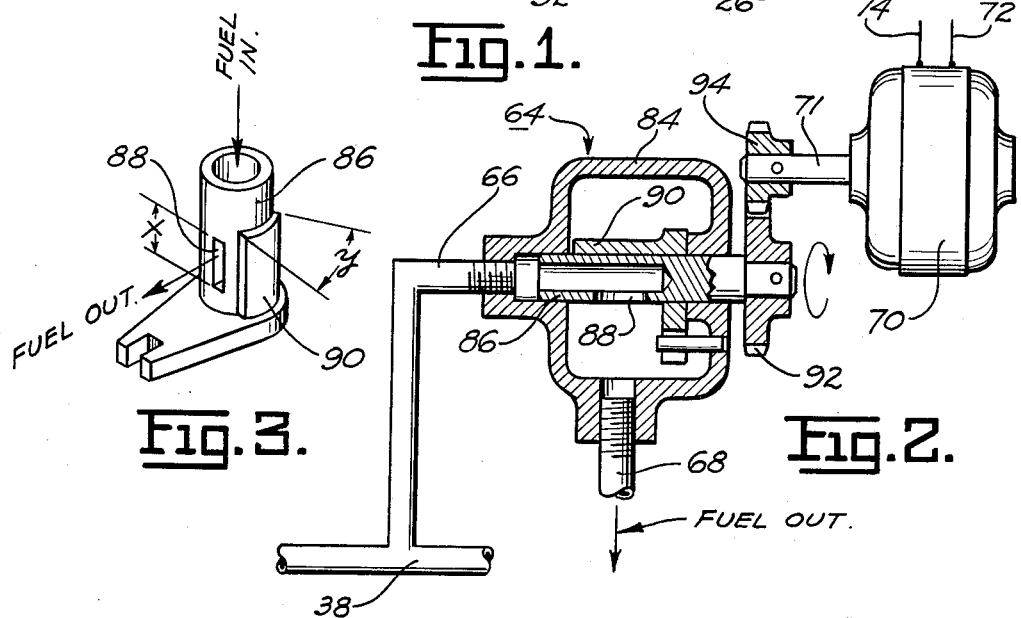
INVENTORS.
SAMUEL E. ARNETT
HARRY E. STARR.
BY
R.Y. Brodahl
ATTORNEY.

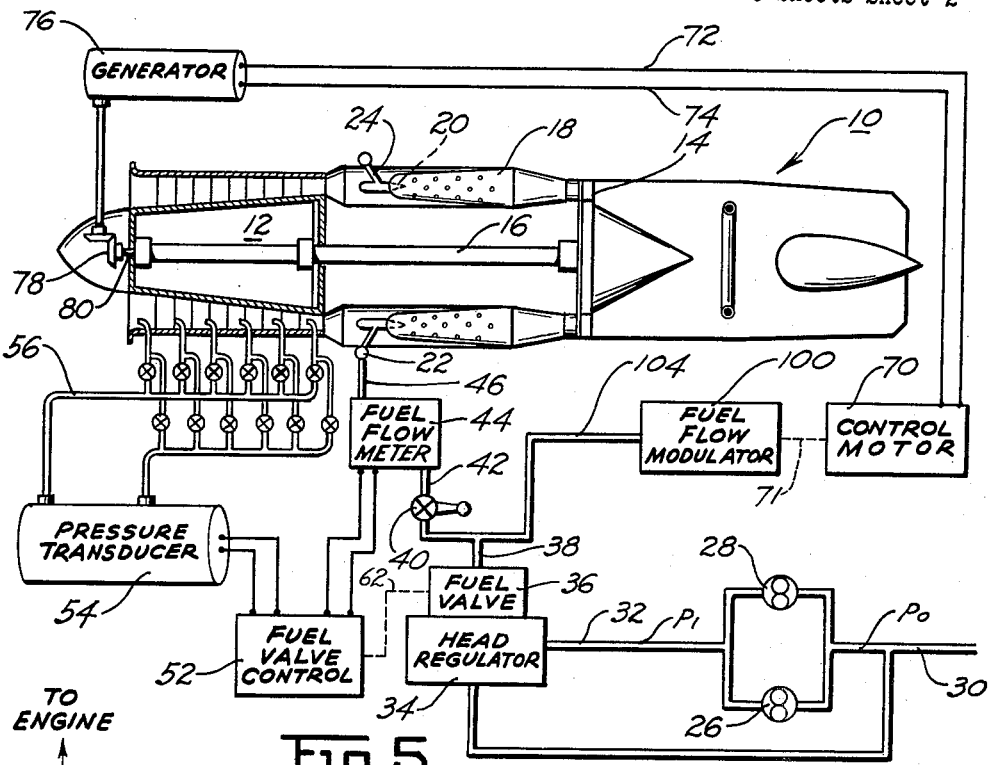
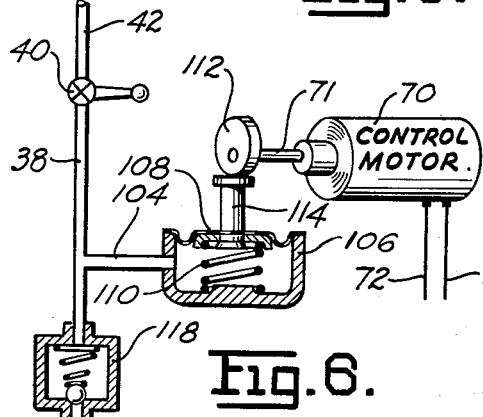
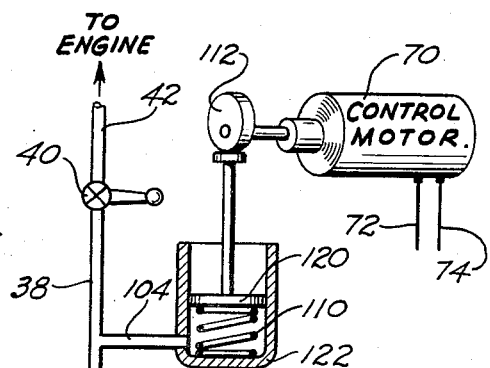
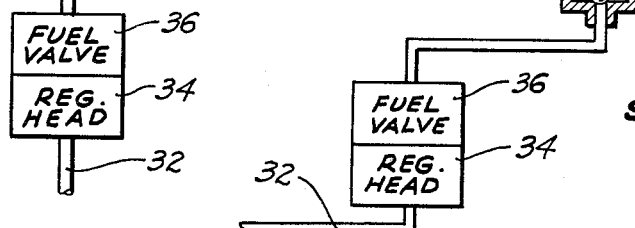

INVENTORS.
SAMUEL E. ARNETT.
HARRY E. STARR.
BY
*R.J.Brodahl*
ATTORNEY.

United States Patent Office 3,002,349
Patented Oct. 3, 1961

3,002,349
FUEL CONTROL APPARATUS FOR AN INTERNAL COMBUSTION ENGINE
Samuel E. Arnett and Harry E. Starr, South Bend, Ind., assignors to The Bendix Corporation, a corporation of Delaware
Filed July 26, 1956, Ser. No. 600,184
12 Claims. (Cl. 60—39.28)

The present invention relates to fuel control apparatus, and more particularly relates to fuel control apparatus for an internal combustion engine such as a gas turbine or spark ignition or the like engine.

It is an object of the present invention to provide an improved fuel control apparatus for an internal combustion engine.

It is another object of the present invention to provide an improved fuel control apparatus for an engine such as a gas turbine engine including a compressor subject to stall or unstable operation.

It is a different object of the present invention to provide an improved fuel control apparatus for a gas turbine engine, including a compressor subject to stall, which fuel control apparatus is operative to anticipate the approach of the compressor stall condition and to modify the supply of fuel to the engine to substantially avoid the compressor stall condition.

It is a further object of the present invention to provide an improved fuel control apparatus for an engine subject to characteristic unstable operation, which apparatus is operative to control the supply of fuel to the engine such that said unstable operation is substantially avoided.

It is an additional object of the present invention to provide an improved fuel control apparatus for an engine, including a compressor subject to a range of unstable operation, which apparatus is operative to control the engine such that the aprroach of the unstable operating range is detected and then to control the supply of fuel to the engine such that said unstable operating range is substantially avoided.

These and other objects and advantages of the present invention will become apparent in view of the following description taken in conjunction with the drawings wherein:

FIGURE 1 is a schematic showing of fuel control apparatus in accordance with the present invention;

FIGURE 2 is a schematic showing of one suitable form of the by-pass control device shown in FIGURE 1;

FIGURE 3 is a perspective view of a portion of the by-pass control device shown in FIGURE 2;

FIGURE 5 is a schematic showing of a modification of the fuel control apparatus in accordance with the present invention;

FIGURE 6 is a schematic showing of one form of the fuel flow modulator device shown in FIGURE 5;

FIGURE 7 is a schematic showing of a second form of the fuel flow modulator device shown in FIGURE 5;

Figure 8:
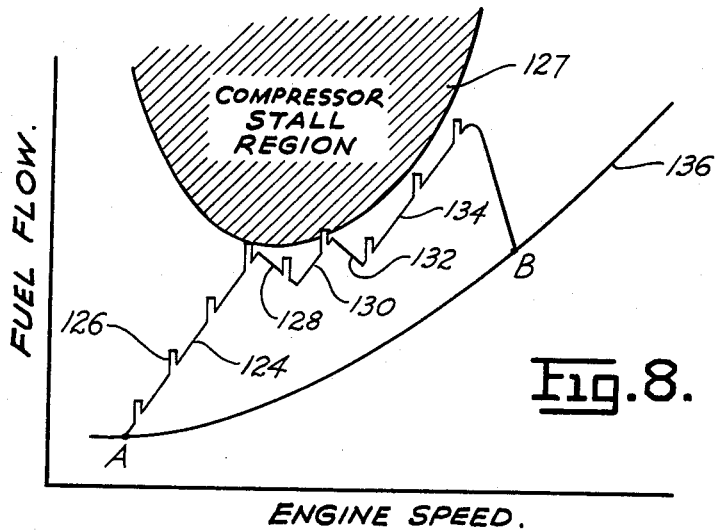
FIGURE 8 is a curve chart illustrating the operation of the fuel control apparatus in accordance with the present invention.

In FIGURE 1 there is shown an internal combustion engine such as a gas turbine engine 10, including a compressor 12 and a turbine 14 interconnected by the drive shaft 16. A plurality of burners or combustion chambers 18 are provided, each of which is equipped with a fuel nozzle 20. A fuel manifold 22 is connected through individual fuel lines 24 to the nozzles 20. A pair of fuel supply pumps 26 and 28 are connected between a first conduit 30 containing fuel at an inlet pressure $P_0$ and a second conduit 32 containing fuel at pump outlet pressure $P_1$. The conduit 32 supplies fuel to a head regulator device 34 operative with the fuel control valve 36. The metered fuel passes from the fuel valve 36 through a conduit 38 to a manual cut-off valve 40, and then through a conduit 42 and a fuel flow measuring device 44 and through a conduit 46 to the fuel manifold 22. The output of the fuel flow measuring device 44 is in the form of an electrical control signal and is connected through a pair of conductors 48 and 50 to a fuel valve control 52. A pressure responsive transducer device 54 is responsive to the output pressure of the final stage of the compressor unit 12, or any one of the intermediate stages of the compressor unit 12, or a pressure difference between predetermined stages of the compressor 12 in accordance with the teachings of our copending patent application Serial No. 600,183, filed July 26, 1956 and assigned to the same assignee as the present application, and as controlled by the illustrated control valves through the conduit 56. The output of the pressure transducer device 54 is in the form of a second electrical control signal and is supplied through conductors 58 and 60 to the fuel valve control 52. The latter fuel valve control 52 is operative to control the operation of the fuel valve 36 through the control member 62 or any other suitable control connection. A fuel by-pass control device 64 is connected by a conduit 66 to the fuel valve outlet conduit 38 and is connected through a conduit 68 to the pump inlet conduit 30. A control motor 70 is operationally connected to the by-pass control device through control shaft 71 and is electrically controlled and energized through a pair of conductors 72 and 74 from a generator or other suitable power supply device 76, which is connected through a bevel gear arrangement 78 and a shaft 80 to the compressor 12, the turbine 14 and the drive shaft 16.

In FIGURE 2 there is shown a detailed schematic of the by-pass control device 64 shown in FIGURE 1 and including an outer housing member 84, a rotary valve member 86 including a port or fuel passage 88 and a sleeve member 90 which is rigidly fastened to the housing member 84. The rotary valve member 86 is rotated by means of a driven gear 92 and a driver gear 94 which is connected to the control motor 70 through the control shaft 71 as shown in FIGURE 1.

In FIGURE 3 there is shown a partial schematic view of the FIGURE 2 by-pass control device, showing the rotary valve member 86 including the fuel port 88 and the sleeve member 90. The fuel port 88 may be varied in its lengthwise dimension or varied in its dimension perpendicular to the axis of rotation to thereby vary the amount of fuel by-passed from the conduit 38 leading to the pump inlet conduit 30 as shown in FIGURE 1. Also, the sleeve member 90 may be varied in its dimension along a circumference taken in a plane perpendicular to the axis of rotation of the rotary valve member 86 to also vary the amount of fuel by-passed from the fuel valve outlet conduit 38 to the pump inlet conduit 30 as shown in FIGURE 1.

Figure 4:
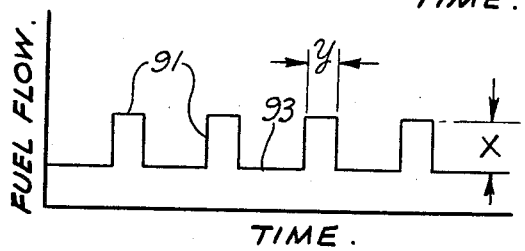
FIGURE 4 is a curve chart illustrating the fuel flow obtained by the use of the by-pass control device shown in FIGURE 2.

The curve chart shown in FIGURE 4 illustrates the operation of the apparatus shown in FIGURE 3. In FIGURE 4 the curve chart shows the fuel flow to the engine as a function of time, which fuel flow is supplied to the fuel manifold 22. The spikes 91 or periodically increased quantities of fuel occur in the apparatus shown in FIGURE 1 when the fuel port 88 is blocked by the sleeve member 90. The height of the individual spikes 91 or increased quantities of fuel relative to the fuel flow during the by-pass of fuel as shown by level 93 and as illustrated by the letter X in FIGURE 4 is determined by the dimension of the fuel port 88 taken in a direction substantially parallel to the rotational axis of the rotary valve member 86 or the width of the fuel port 88 taken along the circumference in a plane substantially perpendicular to the axis of rotation of the rotary valve member 86. The width of the spikes 91 or periodic pulses of fuel as indicated by the letter Y in FIGURE 4 may be controlled by the dimension of the sleeve member 90 taken along a circumference in a plane substantially perpendicular to the rotary axis of the valve member 86.

The apparatus shown in FIGURE 5 comprises a modification of the apparatus shown in FIGURE 1. In FIGURE 5 there is shown a gas turbine engine 10, including a compressor 12 and a turbine 14 interconnected by a drive shaft 16, the combustion chambers 18, each including a fuel nozzle 20, and a fuel manifold 22 and the individual fuel lines 24. The fuel flow measuring device 44 is still shown connected to the fuel manifold 22 through the conduit 46. The apparatus in FIGURE 5 which is similar and corresponds to like apparatus shown in FIGURE 1 has been given similar identifying numerals. The fuel flow modulator device 100 is connected to receive fuel through the conduit 104 from the conduit 38 and then to periodically discharge control fuel back through the conduit 104 to the conduit 38 and hence to the engine 10 through the fuel manifold 22. The control motor 70 corresponding to the like control motor shown in FIGURE 1 is connected to control the operation of the fuel flow modulator device 100.

In FIGURE 6 there is shown one suitable form of the fuel flow modulator device 100 as shown in FIGURE 5. In FIGURE 6 there is shown a fluid chamber or container 106 including a movable wall or diaphragm 108, which is operative against the force of a compression spring 110 by means of an eccentric member or cam 112 and a control arm 114. The eccentric member 112 is driven by the control motor 70 through the control shaft 71. Fuel is received from the conduit 38 through the conduit 104 into the fuel chamber or container 106. When the movable wall or diaphragm 108 is moved by the eccentric 112 such that the volume of the fuel chamber 106 is thereby decreased this provides a discharge of fuel through the conduit 104 into the conduit 38 and through the cut-off valve 40 and the conduit 42 to the engine. A check valve or unidirectional flow valve 118 is connected or provided in the conduit 38 as shown.

Referring to the apparatus shown in FIGURE 7 this comprises another suitable form of the fuel flow modulator device 100 shown in FIGURE 5 wherein the eccentric member 112 is still driven by the control motor 70 as shown in FIGURE 6, but in the apparatus of FIGURE 7 it moves a control piston 120 to thereby decrease or increase the volume of the fluid chamber 122 against the action of the compression spring 110, to thereby discharge a quantity of fuel into the conduit 38 and hence through the manual cut-off control 40 and the conduit 42 to the engine.

As a still further modification of the apparatus shown in FIGURES 6 and 7, a fuel supply conduit may if desired be connected between the fuel conduit 32 and the fuel chamber 106 of FIGURE 6 or the fuel chamber 122 of FIGURE 7, with a flow control valve operated by the eccentric 112 being included in the fuel conduit 104 such that when the fuel chambers are filling with fuel the latter valve would be closed and when the fuel chambers are discharging fuel to the conduit 38 the latter valve would be open.

In FIGURE 8 there is shown a curve chart illustrating the fuel flow to the engine as a function of engine speed, and illustrating how the fuel flow is increased along a path or pattern illustrated by the curve 124 until due to the operation of fuel flow modulator apparatus 100 as shown in FIGURE 5 or of the by-pass control device 64 is shown in FIGURE 1 there is introduced a spike 126 or discharge quantity of fuel such that this increased amount of fuel flow causes the engine to enter the compressor stall region momentarily to give an indication of the approach of the compressor stall region 127 such that the fuel flow can be changed along a second pattern or curve 128 until a safe operating position is reached at which time the fuel flow may be increased along a third pattern or curve 130 until a spike or discharge quantity of fuel indicates the approach of the compressor stall region 127 for a second time at which time the fuel flow is controlled along a pattern or curve 132 until the fuel flow is again increased along a pattern or curve 134 until the governor device causes the fuel flow to return to the position B along the steady state curve 136 as initially desired from the initial position A on the steady state curve 136.

Figure 9:
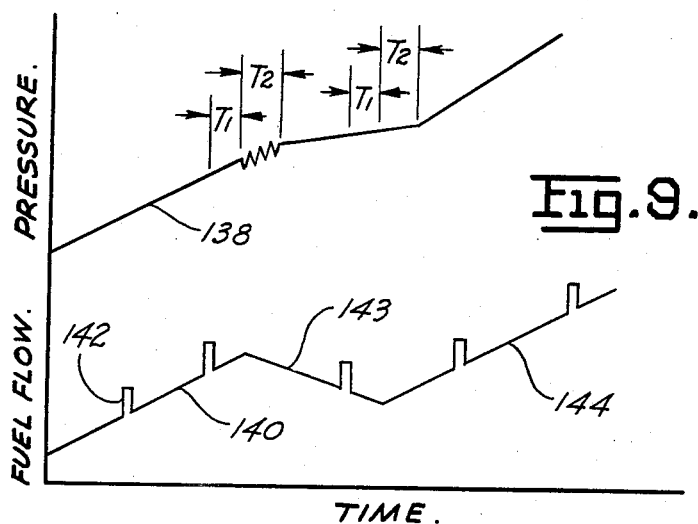
FIGURE 9 illustrates the control parameter obtainable in accordance with the teachings of the present invention.

In FIGURE 9 there is illustrated the change in a predetermined output pressure of the compressor 12 as illustrated by the curve 138 whether it be the final stage output pressure or preferably an intermediate stage output pressure. The curve 140 illustrates the fuel flow to the engine as a function of time. As the fuel is initially increased along the curve 140 the fuel flow modulator 100 as shown in FIGURE 5 or the by-pass control device 64 as shown in FIGURE 1 causes a change in the fuel flow to occur such that a control spike 142 appears in the fuel flow pattern. This spike 142 or discharge quantity of fuel flow passes to the engine and with a time delay of $T_1$ relative to the compressor pressure curve 138 causes the compressor to enter the stall or unstable operating region for a time period $T_2$. The pressure transducer 54 responds to the selected compressor output pressure, and causes the fuel valve control 52 to vary the fuel flow by means of the fuel valve 36 such that the fuel flow follows the downward curve 143 for a predetermined time duration or until a safe or a different operating region is reached as indicated by the output of the pressure transducer device 54 due to a succeeding fuel pulse not entering the stall region at which time the fuel flow may be increased along the curve 144. If another discharge quantity or fuel flow spike 142 causes the engine to enter the compressor stall region, such that the approach of the compressor stall region is thereby detected, the fuel flow may be again decreased accordingly. In this manner the compressor region is substantially circumvented and the engine is allowed to follow a very favorable acceleration curve in general while the compressor stall region is substantially avoided.

The apparatus in accordance with the present invention is operative to provide a compressor stall control based on the fact that multi-region rotating stall pressure fluctuations exist in the multi-stage compressor prior to single region or total rotating stall. Multi-region rotating stall is characterized by two or more regions of stall corresponding to two or more preliminary stages of the multi-stage compressor operating in a stall condition, which two or more regions of stall are rotating in the compressor producing output pressure fluctuations or pulses. Single region or total rotating stall is characterized by a large amplitude oscillation in the output final stage compressor discharge pressure having a frequency of approximately 50 percent of the engine speed.

The apparatus shown in FIGURES 1 and 5 are operative to introduce a control modification or change in the fuel flow pattern to the engine such that discharge quantities or control spikes of fuel are introduced to the engine away from the normal or average fuel flow pattern, such that the control apparatus is thereby operative to anticipate the approach of compressor stall or unstable engine operation, and to change the fuel flow pattern such that the control apparatus is operative to substantially avoid the compressor stall zone other than during the time that these discharge quantities or spikes of fuel flow cause the engine operation to enter the compressor stall region. Thus the discharge quantities or spikes in the fuel flow probe into the compressor stall region only momentarily and create a light and unobjectionable compressor stall condition of very short duration. This light and unobjectionable compressor stall operation is effective to give an indication that the stall region is being approached and through the control system in accordance with the present invention the engine operation is changed to substantially avoid the compressor stall operating condition.

The apparatus shown in FIGURE 1 is a by-pass type of fuel modulation or modification apparatus and is operative as shown in FIGURES 2, 3 and 4 to by-pass fuel away from the conduit 38 leading to the engine fuel manifold 22, other than for the time interval when the fuel port or slot 88 is blocked or closed by the sleeve member 90. In accordance with the apparatus shown in FIGURE 5 an additional discharge quantity of fuel is introduced into the fuel conduit 38 leading to the fuel manifold 22, such that the discharge quantity is added to the normal fuel pattern as determined by the fuel valve 36.

Although only the preferred embodiments of the present invention have been schematically illustrated and described it will be apparent that those skilled in the art that various changes in the structure and relative arrangement of parts may be made to suit individual requirements without departing from the scope of the present invention. For example, the operation of the control motor 70 may be controlled by and responsive to the output of the pressure transducer device 54, for example through a differential control circuit in accordance with copending application Serial No. 600,183, filed July 26, 1956 by the same inventors as the present application, such that the output pressure characteristics of the compressor 12 would be operative to control the control motor 70 or at least to initiate the operation of the control motor 70 such that the by-pass control device 64 would be normally stopped and the rotary valve member 86 would be stationary with the slot member 88 closed or opened by the sleeve member 90 as desired, and the by-pass control device 64 would begin its rotating and described by-pass operation only when the output pressure characteristics as determined by the pressure transducer device 54 would indicate the general or initial rough approach to the compressor stall or engine unstable operating region. In this manner the fuel by-pass control device 64 if the slot member 88 were closed would not require the recirculation of considerable amounts of fuel through the fuel pumps 26 and 28, unless the compressor stall or engine unstable operating region was relatively near at hand. Similarly, with the apparatus of FIGURE 5, the fuel flow modulator 100 could be controlled and in operation by its control motor 70 only during periods when the fuel flow curve as shown in FIGURE 8 was approaching the compressor stall region. In this respect the pressure transducer 54 could give an output signal which could be differentiated to indicate a change in the output pressure conditions from the compressor 12, and this control signal could be used to cause the control motor 70 to begin its operation when the fuel flow curve was approaching the stall region within a predetermined distance in the order of twice or so times the height of the discharge pulses 126 if desired.

We claim:

1. In fuel control apparatus for a combustion engine including a rotatably mounted air compressor having characteristic unstable operation in its intermediate speed range, the combination of a fuel conduit connected to deliver fuel to said engine in accordance with the total fuel requirements thereof, a fuel metering valve operatively connected to said fuel conduit for controlling fuel flow therethrough to said engine in accordance with a predetermined fuel flow schedule, first control means operatively connected to said fuel conduit for creating a substantially instantaneous increase and decrease in the fuel flow through said fuel conduit throughout the operating range of the engine, said increase and decrease in fuel flow being augmentative to said predetermined fuel flow schedule and operative to cause momentary unstable operation of said compressor, and second control means responsive to a predetermined engine operating variable resulting from the rotational speed of said compressor and said predetermined substantially instantaneous increase and decrease in fuel flow, said second control means being operatively connected to said fuel metering valve for controlling the fuel flow regulating function thereof as a function of said predetermined engine operating variable to avoid said characteristic unstable operation.

2. In fuel control apparatus for a combustion engine including a rotatably mounted air compressor having characteristic unstable operation in its intermediate speed range, the combination of a fuel conduit connected to deliver fuel to said engine in accordance with the total fuel requirements thereof, a fuel metering valve operatively connected to said fuel conduit for controlling fuel flow therethrough to said engine in accordance with a predetermined fuel flow schedule, first control means operatively connected to said fuel conduit for creating a substantially instantaneous increase and decrease in the flow of fuel through said fuel conduit throughout the operating range of the engine, said increase and decrease in fuel flow being augmentative to said predetermined fuel flow schedule and operative to cause momentary unstable operation of said compressor, and second control means responsive to a predetermined compressor generated air pressure resulting from the rotational speed of said compressor and said predetermined substantially instantaneous increase and decrease in fuel flow, said second control means being operatively connected to said fuel metering valve for controlling the fuel flow regulating function thereof as a function of said compressor generated air pressure to avoid said characteristic unstable operation.

3. In control apparatus for an engine including a compressor and a turbine for rotating the compressor, said compressor having a characteristic zone of unstable operation in its intermediate speed range, a fuel conduit for supplying fuel to the engine, fuel valve means for controlling the fuel flow through said conduit in accordance with a predetermined fuel flow schedule, fuel flow control means including a by-pass conduit connected between said fuel conduit downstream from said fuel valve means and a low pressure source of fuel, normally open valve means in said by-pass conduit for controlling fuel flow therethrough; and actuating means operatively connected to said normally open valve means for actuating said normally open valve means to a closed position at predetermined regularly occurring time intervals to effect a substantially instantaneous increase and decrease in said predetermined fuel flow schedule to thereby cause said compressor to momentarily enter said characteristic zone of unstable operation when operating in said intermediate speed range, and control means responsive to a predetermined compressor operating pressure resulting from the speed of said compressor and said substantially instantaneous increase and decrease in said predetermined fuel flow schedule, said control means being operatively connected to said fuel valve means for actuating the same to modify said predetermined fuel flow schedule to avoid said characteristic zone of unstable operation.

4. In fuel control apparatus for a combustion engine including a rotatably mounted compressor having characteristic unstable operation in its intermediate speed range, the combination of a fuel conduit for supplying fuel to the engine, a fuel metering valve operatively connected to said conduit for controlling fuel flow therethrough to said engine in accordance with a predetermined fuel flow schedule, a branch passage connected between said fuel conduit and a source of fuel, means operatively connected to said branch passage for controlling the flow of fuel therethrough to establish a predetermined substantially instaneous increase and decrease in flow through said branch passage which augments said predetermined fuel flow schedule to thereby cause momentary unstable operation of said compressor, means responsive to a compressor generated air pressure which varies in a predetermined manner in response to the speed of said compressor and said predetermined substantially instantaneous increase and decrease in fuel to the engine to indicate the approach of said characteristic unstable operation, and means operatively connected to said last named means and said fuel metering valve for controlling the operation of said fuel metering valve as a function of said compressor generated air pressure to cause a decrease in said predetermined fuel flow schedule through said fuel conduit to avoid said characteristic unstable operation.

5. In control apparatus for an engine including a compressor and a turbine for rotating the compressor, said compressor having a characteristic zone of unstable operation in its intermediate speed range, the combination of a fuel conduit for supplying fuel to the engine, first fuel flow control means for controlling the fuel flow through said conduit to said engine in accordance with a predetermined fuel flow schedule, second fuel flow control means operatively connected to said fuel conduit for effecting a substantially instantaneous increase and decrease in said predetermined fuel flow schedule to thereby cause said compressor to momentarily enter said characteristic zone of operation when operating in said intermediate speed range, said second fuel flow control means including a pressure responsive member and an always open passage connecting said pressure responsive member with an engine generated fluid pressure, said fluid pressure varying in accordance with the speed of said compressor and said substantially instantaneous increase and decrease in fuel flow and being indicative of the entry of said compressor into said characteristic zone of unstable operation, and means operatively connecting said pressure responsive member to said first fuel flow control means for modifying said predetermined fuel flow schedule to avoid said characteristic zone of unstable operation.

6. In control apparatus for a gas turbine engine having characteristic unstable operation in its intermediate speed range, the combination of a source of fuel, a fuel conduit connected to deliver fuel from said source to the engine, a fuel metering valve operatively connected to said conduit for controlling fuel flow therethrough to said engine in accordance with a predetermined fuel flow schedule, a by-pass conduit connected between said fuel conduit and said source of fuel, normally open valve means operatively connected to said by-pass conduit for controlling fuel flow therethrough, means operatively connected to said valve means for periodically actuating said valve means to a closed position for a predetermined relatively short interval of time to cause a corresponding substantially instantaneous incease and decrease in said predetermined fuel flow schedule, said substantially instantaneous increase and decrease in fuel flow being effective to initiate a condition of engine operation which indicates entering into said characteristic unstable operation, and means responsive to said condition of engine operation operatively connected to said fuel metering valve for actuating said fuel metering valve toward a closed position to reduce fuel flow and avoid said characteristic unstable operation.

7. In control apparatus for a combustion engine including a rotatably mounted compressor having characteristic unstable operation in its intermediate speed range, the combination of a source of fuel, a fuel conduit connected to deliver fuel from said source to said engine, a fuel metering valve operatively connected to said fuel conduit for controlling fuel flow therethrough, a by-pass conduit connected between said source of fuel and said conduit, normally open valve means operatively connected to said by-pass conduit for controlling fuel flow therethrough, means operatively connected to said valve means for periodically actuating said valve means to a closed position for a predetermined relatively short interval of time to cause a corresponding substantially instantaneous increase and decrease in the flow of fuel through said fuel conduit to said engine, and means responsive to first and second compressor generated air pressures which vary in response to said substantially instantaneous increase and decrease in fuel flow and indicate entry into said characteristic unstable operation, said last named means being operatively connected to said fuel metering valve for controlling said fuel metering valve as a function of the pressure differential between said first and second compressor generated air pressures to reduce fuel flow and avoid said characteristic unstable operation.

8. In fuel control apparatus for an engine having a rotatably mounted air compressor, said compressor having characteristic unstable operation over a portion of its speed range, the combination of a fuel conduit connected to supply fuel to the engine, a fuel pump having an inlet and an outlet and being connected to said conduit for supplying fuel to said conduit, fuel valve means for controlling the fuel flow through said conduit to the engine in accordance with a predetermined fuel flow schedule, fuel flow control means for introducing a predetermined substantially instantaneous increase and decrease in said fuel flow through said conduit to the engine, said increase and decrease in fuel flow being augmentative to said predetermined fuel flow schedule and operative to cause momentary unstable operation of said compressor, said fuel flow control means including a fuel by-pass control member connected from the output of said pump to the inlet of said pump and means operatively connected to said by-pass control member for alternately opening and closing said fuel by-pass control member at predetermined regularly occurring intervals of time to thereby establish said substantially instantaneous increase and decrease in fuel flow, and control means for controlling the operation of said fuel valve means in response to a predetermined operating fluid pressure in said engine resulting from said predetermined increase and decrease in fuel flow in the fuel flow.

9. In fuel control apparatus for an engine having a rotatably mounted air compressor, said compressor having characteristic unstable operation over a portion of its speed range, the combination of a fuel conduit connected to said engine, a fuel pump having an output and an input and being connected for supplying fuel to said conduit, fuel valve means for controlling the fuel flow through said conduit in accordance with a predetermined fuel flow schedule, fuel flow control means for introducing a predetermined substantially instantaneous increase and decrease in said fuel flow through said conduit, said increase and decrease in fuel flow being augmentative to said predetermined fuel flow schedule and operative to cause momentary unstable operation of said compressor, said fuel flow control means including a by-pass control member connected from the output of said pump to the inlet of said pump, with said by-pass control member including a valve member and a sleeve member, such that said increase and decrease in fuel flow through said conduit to the engine can be accomplished by relative movement between said valve member and said sleeve member, and control means for controlling said fuel valve means to thereby modify said predetermined fuel flow schedule to avoid said unstable operation, said control means being responsive to a predetermined engine operating fluid pressure resulting from said predetermined substantially instantaneous increase and decrease in the fuel flow to the engine.

10. In fuel control apparatus for an engine having characteristic unstable operation over a portion of its speed range, the combination of a fuel conduit connected to said engine, a fuel pump having an inlet and an output and being connected for supplying fuel to the engine through said conduit, a fuel metering valve for controlling the pattern of the fuel flow through said conduit, first means operatively connected to said conduit for introducing an abrupt rise and fall into said fuel flow pattern for a certain interval of time at a regularly occurring interval of time, said certain interval of time being relatively short compared to said regularly occurring time interval, said first means including a fuel by-pass control member connected from the outlet of said pump to the inlet of said pump, with said by-pass control member including a rotary valve member and a fixed sleeve member, said valve member including a control fuel passage which is blocked by a predetermined portion of said sleeve member, with the rotary speed of the valve member being variable to determine said abrupt rise and fall in fuel flow through the conduit to the engine, said abrupt rise and fall in fuel flow causing said engine to momentarily enter into said characteristic unstable operation when operating in said portion of its speed range, and second means operatively connected to control the fuel metering valve and responsive to a predetermined engine operating fluid pressure resulting from said change in the fuel flow pattern to the engine, said fuel metering valve being actuated by said second means to modify said fuel flow pattern to avoid said characteristic unstable operation.

11. In fuel control apparatus for an engine having characteristic unstable operation over a portion of its speed range, the combination of a fuel conduit connected to the engine for supplying fuel thereto in accordance with a predetermined fuel flow schedule, fuel valve means for controlling the fuel flow through said conduit to the engine, fuel flow control means operatively connected to said fuel valve means for introducing a predetermined change into said fuel flow through said conduit to the engine, with said fuel control means including a fuel flow variation member including a fuel container and a control member operative with said container for causing said container to discharge fuel into said conduit for a certain interval of time at regularly occurring intervals of time, said certain interval of time being of relatively short duration compared to said regularly occurring time interval, said discharge of fuel into said conduit being augmentative to said predetermined fuel flow schedule and operative to cause said engine to momentarily enter into said unstable operation, and control means for controlling the operation of said fuel valve means and being responsive to a predetermined engine operating fluid pressure resulting from said discharge of fuel into said conduit, said fuel valve means being actuated by said last named control means to cause a decrease in said predetermined fuel flow schedule to avoid said characteristic unstable operation.

12. In fuel control apparatus for an engine having characteristic unstable operation over a portion of its speed range, the combination of a fuel conduit connected to said engine, fuel valve means for controlling the fuel flow through said conduit to the engine in accordance with a predetermined fuel flow schedule, fuel flow control means for introducing a predetermined change into said fuel flow through said conduit to the engine, with said fuel control means including a fuel flow variation member including a fuel container and a control member for causing said container to discharge fuel into said conduit for a certain interval of time at regularly occurring intervals of time, said certain intervals of time being of relatively short duration compared to said regularly occurring time interval, said discharge of fuel into said conduit being augmentative to said predetermined fuel flow schedule, said control member including a movable wall operative with said container and a rotatable eccentric member for periodically moving said wall to thereby discharge a quantity of fuel from said container and through said conduit to the engine, said predetermined change in fuel flow causing said engine to momentarily enter into said characteristic unstable operation, and control means responsive to a predetermined engine operating condition which varies with engine power output resulting from said discharged quantity of fuel flowing through said conduit to the engine, said last named control means being operatively connected to said fuel valve means for actuating the same to modify said predetermined fuel flow schedule to avoid said characteristic unstable operation.

References Cited in the file of this patent

UNITED STATES PATENTS

| | | |
|---|---|---|
| 2,491,361 | Burdick | Dec. 13, 1949 |
| 2,667,743 | Lee | Feb. 2, 1954 |
| 2,673,556 | Reggio | Mar. 30, 1954 |
| 2,737,015 | Wright | Mar. 6, 1956 |
| 2,738,644 | Alford | Mar. 20, 1956 |
| 2,750,741 | Leeper | June 19, 1956 |
| 2,846,846 | Mock | Aug. 12, 1958 |
| 2,851,855 | Gamble | Sept. 16, 1958 |
| 2,923,129 | Schwede | Feb. 2, 1960 |